Patented Jan. 20, 1931

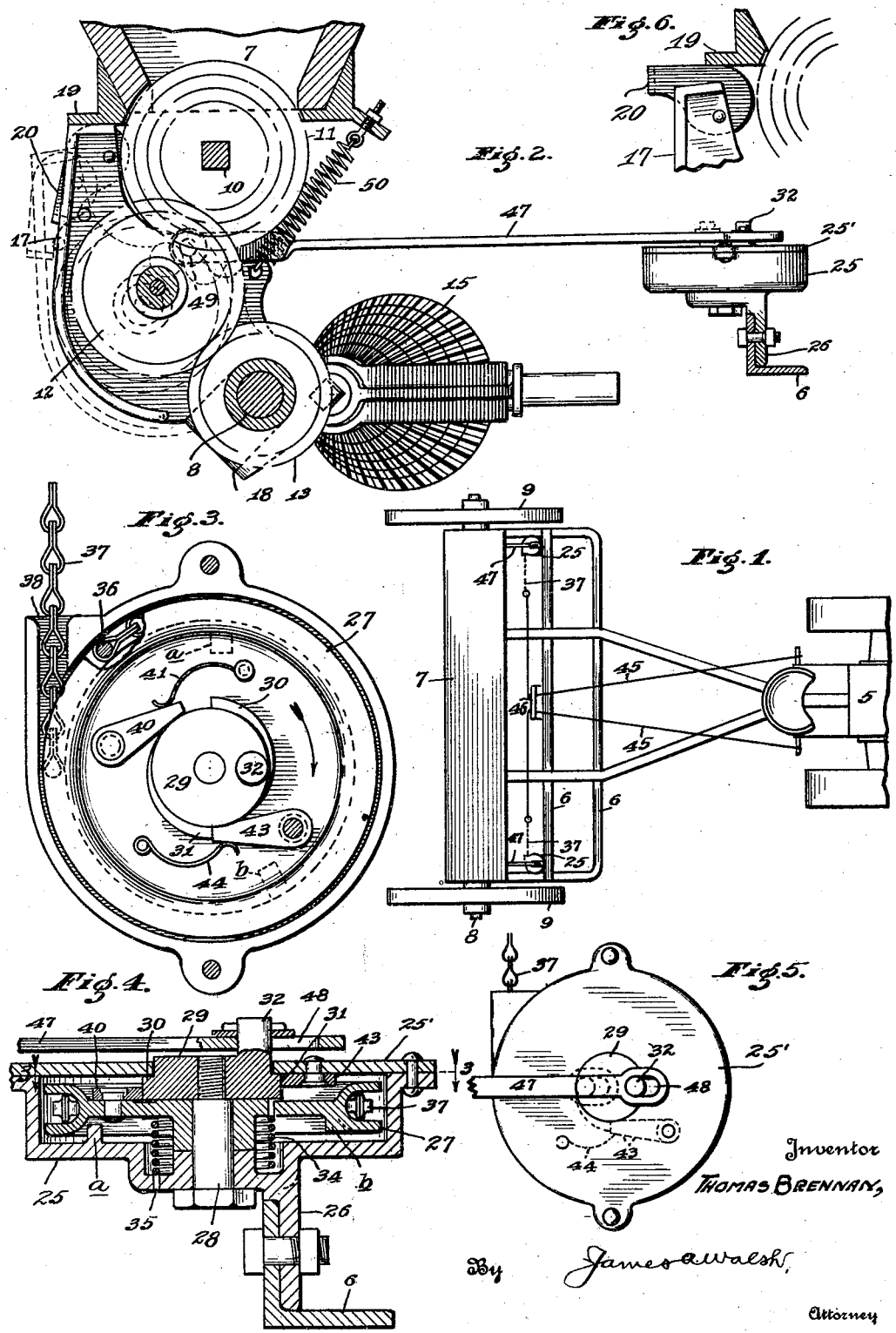

1,789,617

UNITED STATES PATENT OFFICE

THOMAS BRENNAN, OF RACINE, WISCONSIN, ASSIGNOR TO J. I. CASE COMPANY, OF RACINE, WISCONSIN, A CORPORATION

OPERATING DEVICE FOR SEEDING MACHINES

Application filed March 19, 1928. Serial No. 262,658.

The object of my invention is to provide a gear throw-out for seeding and other machines, so constructed and arranged that it may be readily controlled by an operator on the tractor which draws the machine through the fields, or by other attendants, and which device is comparatively simple in operation and effective for the results required, as will be hereinafter more fully explained.

In the accompanying drawing, forming part hereof, Figure 1 is a plan of a seeding machine of any desired construction and design connected to a tractor, which is one type of machine to which my improvement is applicable; Fig. 2, an elevation of a gear assembly which may be employed for operating the feed-runs or seed dispensers of the machine illustrated and showing my improvement connected to a gear carrier; Fig. 3, a plan of the device with the cover removed, the section being taken on the line 3—3 of Fig. 4; Fig. 4, a transverse sectional view of said device; Fig. 5, a plan showing the positions of the connecting-rod which I employ, and Fig. 6 is a detail of the hand operated throw-out.

In said drawings, the numeral 5 indicates a tractor connected to a seeding machine, 6, comprising a hopper, 7, as usual, a driving axle, 8, and carrying wheels, 9, all of which parts may be of any desired construction and arrangement.

In the operation of seeding machines, as is well known, it is essential that means be provided for discontinuing the rotation of the feed-runs in the hopper 7, which are mounted on a drive shaft 10, which shaft is actuated by a gear, 11, meshing with an intermediate gear, 12, and the latter in turn engaging a driving gear, 13, mounted on the axle 8, the axle being adapted to operate a plurality of gears, as indicated by the cone cluster, 15, or otherwise, in some instances employed for changing the speed of the feed-runs or other mechanisms. Under certain conditions as the machine is moving through the fields it becomes necessary to prevent the feed-runs from operating, and this I accomplish by securing the intermediate gear 12 in a bracket or hanger, 17, having a hub or extension which is pivotally mounted upon the axle 8, and secured to the latter by a bolt 18 in substantially the manner shown and described in my copending application Serial No. 258,342, filed March 1, 1928, the upper end of the hanger fitting under a gear-shield, 19, and as a convenient manner for manually manipulating the hanger I provide a cam-grip, as 20, which when thrown upwardly against said shield will force the hanger outwardly so that the gear 12 will become disengaged from gear 11, whereupon the drive-shaft 10 will cease to rotate and the feed-runs mounted thereupon will become inactive or idle.

As indicated, the driving gears may be readily engaged and disengaged according to requirements by an attendant usually upon the rear platform of the machine when the latter is drawn by animals. However, as is now common, such machines are drawn by tractors and it is desirable that the operator may control the feed-runs from his mounted position, and for this purpose I provide an automatic gear throw-out, comprising a casing, 25, embodying a chamber having an extension 26, adapted to be bolted or otherwise secured to a frame part of the machine 6. In said chamber I rotatably mount a grooved wheel, 27, connected to the chamber by a bolt, 28, which is secured to and supports a ratchet, 29, and is rotatable with the latter in the casing, said ratchet embodying a feeding tooth, 30, a retaining tooth, 31, and an eccentrically mounted stud, 32. Attached to said wheel 27 is a spring 34 one end of which is secured to the web of the wheel and at its opposite end is secured to the casing 25 as at 35. In the groove of wheel 27, as indicated in Figs. 3 and 4, I connect, at 36, a chain or equivalent pull, 37, which travels about the wheel and passes out through a socket, 38. Upon wheel 27 I pivot a feeding pawl, 40, the end of which engages the ratchet 29 and is held into such engagement by a spring, as 41, and upon the under side of the cover, 25', which is secured to the chamber 25 by rivets or otherwise I pivotally connect a retaining pawl, 43, held in engagement with ratchet 29 by a spring, as 44.

The device thus described is connected to the frame 6, as indicated in Fig. 4, there being two (a right and left hand), for each end of the machine, as indicated in Fig. 1, and to the chains of each, respectively, I connect a rope or cable, 45, passing through a guide, 46, on the frame and leading to the tractor within convenient reach of the operator thereon. To the stud 32 of the device I secure a connecting rod, 47, having a slot, 48, therein, and which rod is connected, at 49, to the hanger 17 supporting intermediate gear 12, the latter, as shown in Fig. 2, being in engagement with gears 11 and 13. As indicated in Figs. 3 and 5, the stud 32 is at its farthest distance in relation to the hanger which is in gear engaging position as shown in Fig. 2. When the tractor operator desires to disengage the intermediate gear 12 it is but necessary to pull upon a rope 45, which causes the wheel 27 to rotate, and, as it carries the feeding pawl 40, the latter engages the ratchet tooth 30 and actuates the same in the direction of rotation of the wheel, causing the ratchet 29 to rotate a half revolution so that the stud 32 will be urged to the position shown by the dotted lines in Fig. 5, during which movement the connecting rod 47 will force the hanger outwardly and thus disengage the intermediate gear 12 from gears 11 and 13, whereupon the drive shaft 10 ceases to operate, and the feed-runs or dispensers become idle. When it is required to operate the feed-runs it is only necessary to again pull upon the same rope, when the wheel 27 and ratchet 29 are caused to rotate a further half revolution, when connecting-rod 47 will be returned to the position indicated by full lines in Fig. 5, which reciprocating action also returns hanger 17 and intermediate gear 12 to the position indicated in Fig. 2, so that the latter becomes engaged with gears 11 and 13, whereupon the drive-shaft 10 resumes rotation and consequently the feed runs thereon are again operative. During the pulling action of the rope and the revolution of wheel 27 and ratchet 29 the coiled spring 34 has a reversing action upon the wheel, and it is essential that ratchet 29 with its stud 32 will not make more than a half revolution during a single operation, so that I provide the casing 25 with a lug $a$ which will be engaged by a finger $b$ upon the web of wheel 27. When wheel 27 has been rotated to cause one half revolution of ratchet 29 the finger $b$ on wheel 27 will engage lug $a$ and prevent further rotation of the wheel in that direction, and when pawl 40 has advanced ratchet 29 a half revolution in a clockwise direction the pawl 43 will engage the ratchet tooth by which it is being rotated and thus prevent counter clockwise rotation of said ratchet, while wheel 27 under the influence of spring 34 will return to its normal position. In the manner described I provide a device for the purpose which is readily actuated by pulling the rope 45 in the same direction either when engaging or disengaging the intermediate gear in relation to gears 11 and 13, thus conveniently and simply manipulating the gears by the rotary and reciprocating actions of the device as described; and in order to expedite the return of hanger 17 either manually or automatically I connect the same by a spring, 50, to the shield 19 which assists in adjusting the hanger to the position shown in Fig. 2, the slot 48 in rod 47 permitting free movement of hanger 17 when the latter is adjusted by hand. The casing 25 is provided with a lug $a$, and the wheel 27 carries a finger $b$, which finger engages said lug when the wheel has been rotated to gear throw-out position, thus preventing further rotation of the wheel, and from which point of contact the wheel will be returned to initial position by the action of coiled spring 34.

I claim as my invention:

In an operating device for feeding machines, a casing, a wheel in the casing, a ratchet in the casing, means for connecting the wheel and ratchet to the casing, a stud mounted eccentrically on said ratchet, means on the wheel for controlling rotation of the ratchet, means in the casing for limiting the movement of the wheel to half revolution, a link slidably connected to the stud, flexible means connected to the wheel for actuating the same to turn the ratchet one-half revolution when pulling force is imparted to said flexible means and to complete the revolution of the ratchet when such pulling force is again imparted whereby said link is caused to reciprocate, and a spring connected to the casing and the wheel for returning the latter to normal position.

In testimony whereof I affix my signature.

THOMAS BRENNAN.